United States Patent
Mayer

(10) Patent No.: US 9,227,542 B2
(45) Date of Patent: Jan. 5, 2016

(54) FITTING SYSTEM FOR A VEHICLE SEAT

(75) Inventor: Thomas Mayer, Remscheid (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 311 days.

(21) Appl. No.: 13/574,204

(22) PCT Filed: Jan. 13, 2011

(86) PCT No.: PCT/EP2011/000120
§ 371 (c)(1), (2), (4) Date: Sep. 17, 2012

(87) PCT Pub. No.: WO2011/088969
PCT Pub. Date: Jul. 28, 2011

(65) Prior Publication Data
US 2013/0001998 A1    Jan. 3, 2013

(30) Foreign Application Priority Data

Jan. 20, 2010   (DE) .................. 10 2010 005 471

(51) Int. Cl.
| | | |
|---|---|---|
| *B60N 2/225* | (2006.01) | |
| *B60N 2/235* | (2006.01) | |
| *B60N 2/68* | (2006.01) | |
| *F16B 21/20* | (2006.01) | |

(52) U.S. Cl.
CPC ............ *B60N 2/682* (2013.01); *B60N 2/2252* (2013.01); *B60N 2/2356* (2013.01); *B60N 2205/50* (2013.01); *F16B 21/20* (2013.01)

(58) Field of Classification Search
USPC ............ 297/361.1, 367 R, 367 P, 367 L, 368, 297/370, 362.12, 362.14
See application file for complete search history.

(56) References Cited

U.S. PATENT DOCUMENTS

| | | | | |
|---|---|---|---|---|
| 2,950,937 A | * | 8/1960 | Bedford, Jr. .................. | 403/372 |
| 3,007,726 A | | 11/1961 | Parkin | |
| 3,027,609 A | * | 4/1962 | Parkin et al. .................. | 403/297 |

(Continued)

FOREIGN PATENT DOCUMENTS

| | | |
|---|---|---|
| CN | 101415584 A | 4/2009 |
| DE | 44 36 101 A1 | 6/1995 |

(Continued)

OTHER PUBLICATIONS

Chinese Office Action received in Application No. 2011800060454 dated Jan. 9, 2014.

(Continued)

*Primary Examiner* — David R Dunn
*Assistant Examiner* — Timothy J Brindley
(74) *Attorney, Agent, or Firm* — Foley & Lardner LLP

(57) ABSTRACT

A fitting system for a vehicle seat, in particular for a motor vehicle seat, with an axially extending shaft, which is rotatable in the circumferential direction, with at least one fitting which is provided with a rotatably supported driver which is axially secured by a securing element, for driving or for unlocking the fitting, wherein the shaft cooperates with the driver in the circumferential direction in a rotationally secure manner or mechanically connected, in order to rotate the driver, and with at least one quick fastener which is seated on the shaft in an axially non-displaceable manner, in order to secure the cooperation of shaft and driver axially in at least one direction, has the quick fastener connected with the driver and/or with its securing element.

7 Claims, 4 Drawing Sheets

(56) References Cited

U.S. PATENT DOCUMENTS

| | | | | |
|---|---|---|---|---|
| 3,320,846 | A | * | 5/1967 | Orain .................... 411/521 |
| 3,796,124 | A | * | 3/1974 | Crosa .................... 411/521 |
| D278,883 | S | * | 5/1985 | Frieberg ................ D8/399 |
| 5,634,689 | A | | 6/1997 | Putsch et al. |
| 5,871,414 | A | * | 2/1999 | Voss et al. ............. 475/175 |
| 6,098,504 | A | * | 8/2000 | Hu ......................... 81/125 |
| 6,170,363 | B1 | * | 1/2001 | Hu ......................... 81/125 |
| 6,600,632 | B1 | * | 7/2003 | Prochazka et al. ...... 360/264.1 |
| D528,407 | S | * | 9/2006 | Schwab ................. D8/399 |
| 7,458,639 | B2 | * | 12/2008 | Thiel et al. ............ 297/367 R |
| 7,461,900 | B2 | * | 12/2008 | Lange ................... 297/367 R |
| 7,520,568 | B2 | * | 4/2009 | Hoshihara et al. ...... 297/367 R |
| 7,677,667 | B2 | | 3/2010 | Peters et al. |
| 7,712,747 | B2 | * | 5/2010 | Hu ......................... 279/43.1 |
| 7,731,446 | B2 | * | 6/2010 | Prause .................. 403/372 |
| 7,837,266 | B2 | * | 11/2010 | Lehmann ............... 297/362.12 |
| 7,950,741 | B2 | * | 5/2011 | Mitsuhashi ............ 297/362 |
| 7,950,886 | B2 | * | 5/2011 | Siegal ................... 411/107 |
| 8,360,525 | B2 | * | 1/2013 | Cha et al. .............. 297/362 |
| 8,528,727 | B2 | * | 9/2013 | Lindemann ............ 198/835 |
| D703,034 | S | * | 4/2014 | Stewart ................. D8/399 |
| 8,720,998 | B2 | * | 5/2014 | Stilleke ................. 297/367 R |
| 2009/0289488 | A1 | * | 11/2009 | Mitsuhashi ............ 297/354.12 |
| 2012/0223562 | A1 | * | 9/2012 | Assmann et al. ....... 297/362 |

FOREIGN PATENT DOCUMENTS

| | | |
|---|---|---|
| DE | 199 28 148 A1 | 1/2001 |
| DE | 100 21 404 A1 | 11/2001 |
| DE | 103 52 630 B4 | 6/2005 |
| DE | 1020040 11 267 B4 | 10/2005 |
| DE | 1020040 44 754 B4 | 4/2006 |
| DE | 1020060 15 560 B3 | 8/2007 |
| DE | 1020080 24 853 A1 | 11/2009 |
| DE | 1020100 05 471 A1 | 7/2011 |
| EP | 0 917 984 A2 | 5/1999 |

OTHER PUBLICATIONS http://produkt.conrad.de/45973183/100tlg-schnellbefestiger.htm, 3 pages.

http://www.hbdg.de/schnellbefestiger.html, 1 page.

http://www.starlock.nl/schnellbefestiger.php, 1 page.

International Search Report dated Apr. 20, 2011 as received in corresponding PCT Application No. PCT/EP2011/000120, 4 pages.

International Preliminary Report on Patentability and Written Opinion of the International Searching Authority dated Aug. 16, 2012 as received in corresponding PCT Application No. PCT/EP2011/000120, 8 pages.

* cited by examiner

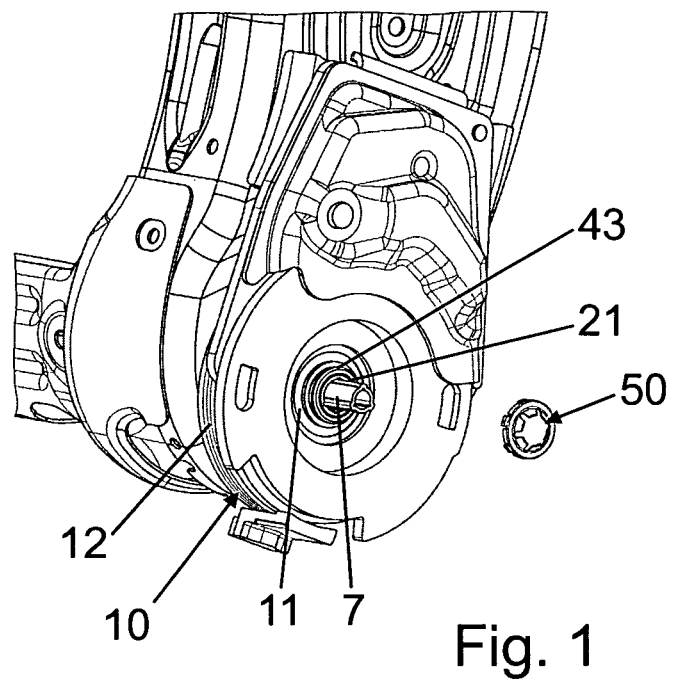
Fig. 1
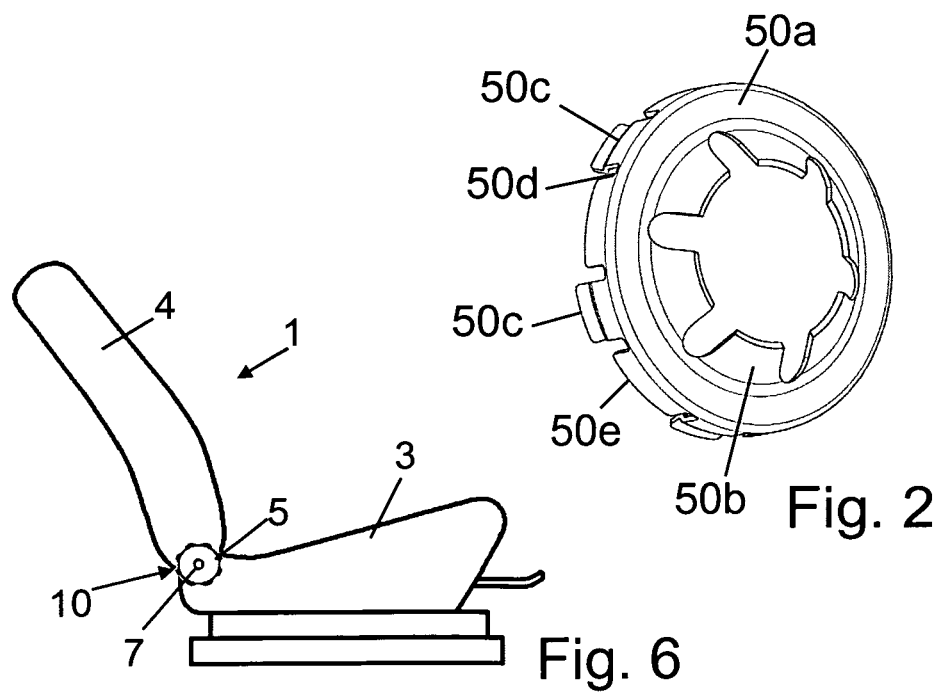
Fig. 2
Fig. 6

FITTING SYSTEM FOR A VEHICLE SEAT

CROSS REFERENCE TO RELATED APPLICATIONS

The present application is a National Stage of International Application No. PCT/EP2011/000120 filed on Jan. 13, 2011, which claims the benefit of German Patent Application No. 10 2010 005 471.2 filed on Jan. 20, 2010, the entire disclosures of which are incorporated herein by reference.

The invention relates to a fitting system for a vehicle seat having the features of the preamble of claim 1.

A fitting system of this type is known from DE 103 52 630 B4. In one of the two fittings, the shaft bears with a boss against the inside of the fitting, while a quick-fastener which is pushed on the shaft, bears against the outside of the fitting. The shaft is thus non-displaceable relative to the fitting.

The object of the invention is to improve a fitting system of the type mentioned in the introduction, in particular to avoid special transformations of the shaft. This object is achieved according to the invention by a fitting system having the features of claim 1. Advantageous configurations are the subject-matter of the subordinate claims.

The quick fastener on the one hand and the driver and/or its securing element on the other hand are separate components (separately configured components). They therefore can be composed of different materials, for example of spring steel on the one hand and of plastics material on the other hand, so that the respectively most favorable properties of the different materials are combined.

By the quick fastener being connected with the driver and/or with its securing element, an axial securing of the shaft in both axial directions is obtained, without particular transformations of the shaft being necessary. In one direction, the quick fastener acts as axial safeguard of the shaft due to its bearing against the fitting, in the opposite direction due to its connection with the driver or with the securing element thereof. The quick fastener consequently secures the cooperation of shaft and driver axially in both directions. With which of the two components the quick fastener is connected directly depends on the orientation of the driver or of the fitting. With both orientations, the quick fastener is connected indirectly with the driver.

Since, in the circumferential direction, the shaft and the driver are connected so as to be rotationally secure or are mechanically connected with a free travel, the connection between the quick fastener and the driver or the securing element thereof can be configured simply. Axially protruding fingers for a form-fitting cooperation by means of hooks, in particular lugs for clipping, are suitable, for example. Other, preferably self-closing connection possibilities can, however, be selected, too. The time for fitting the quick fasteners virtually does not change because of this.

The invention can be used with both, gear fittings and detent fittings. It can be used as a backrest adjusting mechanism of a vehicle seat or also on other sites of the vehicle seat. The quick fastener can cooperate also with an assembly other than a fitting.

The invention is explained in more detail hereinafter with reference to an exemplary embodiment shown in the drawings, in which:

FIG. 1 shows a perspective view of the exemplary embodiment before the quick fastener is mounted, FIG. 2 shows a perspective view of the quick fastener, FIG. 3 shows a perspective view of the exemplary embodiment after the quick fastener has been fitted, FIG. 4 shows a top view of the quick fastener, FIG. 5 shows a cut through the quick fastener along the line V-V in FIG. 4, and FIG. 6 shows a schematic view of a vehicle seat.

Figure 3:
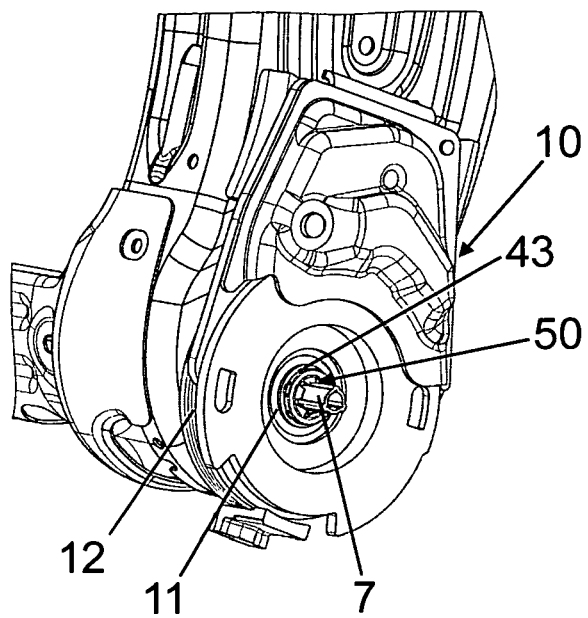
Figure 4:
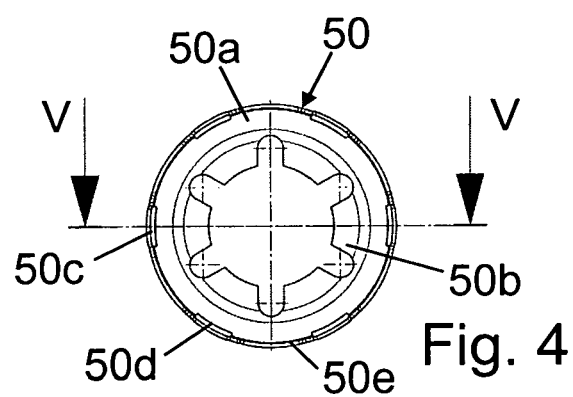
Figure 5:
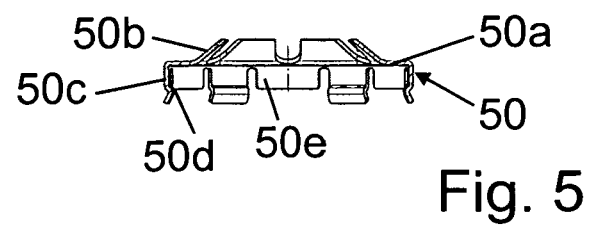

A vehicle seat 1 for a motor vehicle has a seat part 3 and a backrest 4, the inclination of which is adjustable relative to the seat part 3. In order to adjust the inclination of the backrest 4, a shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the shaft 7 engages in a fitting 10 so that it is rotationally secure. The shaft 7 defines the adopted directional data of a cylinder coordinate system. The shaft 7 and the two fitting 10 are components of a fitting system for adjusting the inclination of the backrest 4.

Each fitting 10 has a first fitting part 11 and a second fitting part 12 which are rotatable relative to one another. With the mounting of the fitting 10, one of the two fitting parts 11 and 12 is assigned to the backrest 4 and connected with the structure thereof, while the other of the two fitting parts 11 and 12 is assigned to the seat part 3 and fixedly connected with the structure thereof. The relative rotation of the two fitting parts 11 and 12 causes the adjustment of the inclination of the backrest 4.

A driver 21 is rotatably supported in the center of the fitting 10. The driver 21 is provided centrally with a bore for receiving the shaft 7. The profile of the bore matches the profile of the shaft 7, in the present case a splined shaft profile. The shaft 7 and the driver are preferably coupled so as to be rotationally secure. However, in the circumferential direction, a free travel can also be provided, so that the shaft 7 and the driver 21 are coupled by driving. The driver 21 preferably has a covering disc or a flange on the one side, by means of which it bears against one of the two fitting parts 11 and 12 on the outside, on the outside of the other of the two fitting parts 11 and 12 being axially secured by a—for example ring-shaped, preferably clipped-on—securing element 43. With respect to the further inner structure of the fitting 10, two basic types are conceivable.

Figure 7:
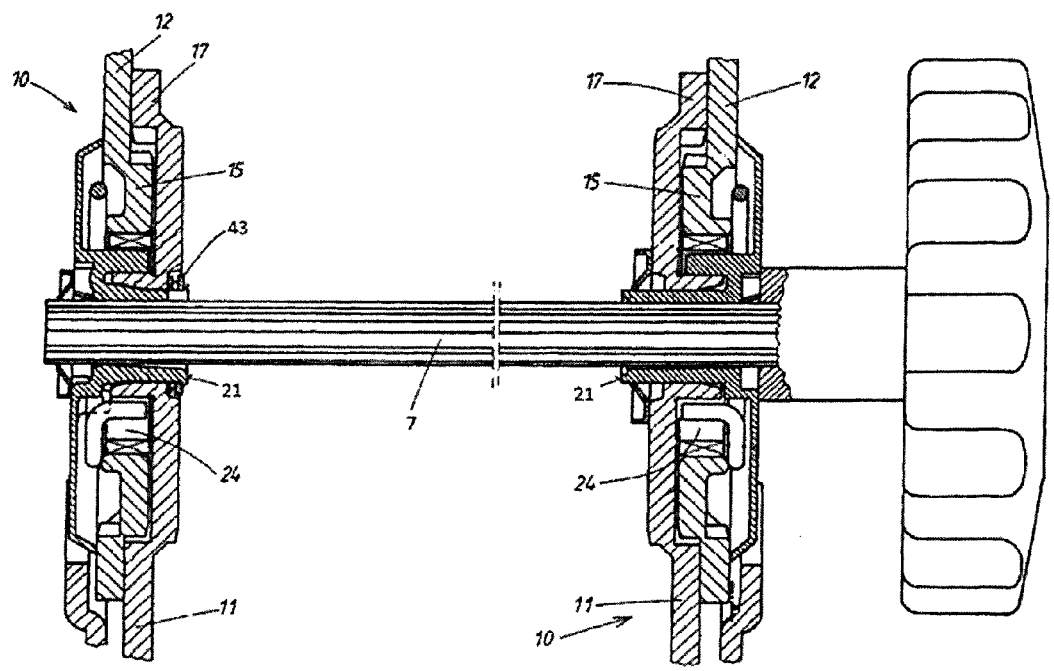
FIG. 7 is a view in longitudinal section of two articulated fittings which are arranged on each longitudinal side of the seat and connected with one another by a transmission rod according to one embodiment.

According to a first basic type (as shown, for example, in FIG. 7), the fitting 10 is configured as a geared fitting, in which the first fitting part 11 and the second fitting part 12 are connected with each other by means of a gear unit for displacement and fixing in position, to be more precise, by means of an eccentric epicyclic gear system, which in the present case is self-locking as described, for example, in DE 44 36 101 A1, the relevant disclosure of which is expressly incorporated herein. In order to form the gear unit, an externally toothed wheel 15 is formed on the second fitting part 12, and an internally toothed ring 17 is formed on the first fitting part 11, the toothed wheel 15 and the toothed ring 17 meshing with each other. The diameter of the tip circle of the external toothing of the toothed wheel 15 is smaller by at least the depth of one tooth than the diameter of the root circle of the internal toothing of the toothed ring 17. A corresponding difference in the number of teeth of the toothed wheel 15 and the toothed ring 17 of at least one tooth permits a rolling movement of the toothed ring 17 on the toothed wheel 15. One of the two fitting parts 11 and 12 has a collar which preferably serves as a bearing for the driver 21. Supported on the collar (with their curved inner surfaces) are two wedge segments which bear (with their curved outer surfaces and preferably by means of a slide bearing bush) the other of the two fitting parts 11 and 12. The driver 21 has a driver segment which engages with clearance between the narrow sides of the wedge segments. The mutually facing broad sides of the wedge segments each receive an end finger of a spring which presses the wedge segments apart in the circumferential direction.

The wedge segments 27 (and the spring) define an eccentric 24 which, in the extension of the direction of eccentricity, presses the toothed wheel 15 into the toothed ring 17 at an engagement site. When drive is effected by means of the rotating shaft 7 which rotates (several times), a torque is first of all transmitted onto the driver 21 and then, by means of the driver segment, onto the eccentric 24 which is so defined and which slides along the slide bearing bush, shifting the direction of eccentricity and thus shifting the site of engagement of the toothed wheel 15 in the toothed ring 17, this presenting itself as a wobbling rolling movement, i.e. as a relative rotation with a superimposed wobbling movement. By this drive of the fittings 10, the inclination of the backrest 4 is continuously adjustable between several positions of use.

Optionally, a third fitting part is provided which, on the one hand is fixedly connected with the structure of the backrest 4 and, on the other hand, is pivotably supported relative to the fitting part 11 or 12 which is not assigned to the seat part 3 and is releasably locked with it. This configuration allows a free-pivoting of the backrest 4 for facilitating the access to a rear seat row, without changing the adjusted inclination of the backrest 4.

Figure 8:
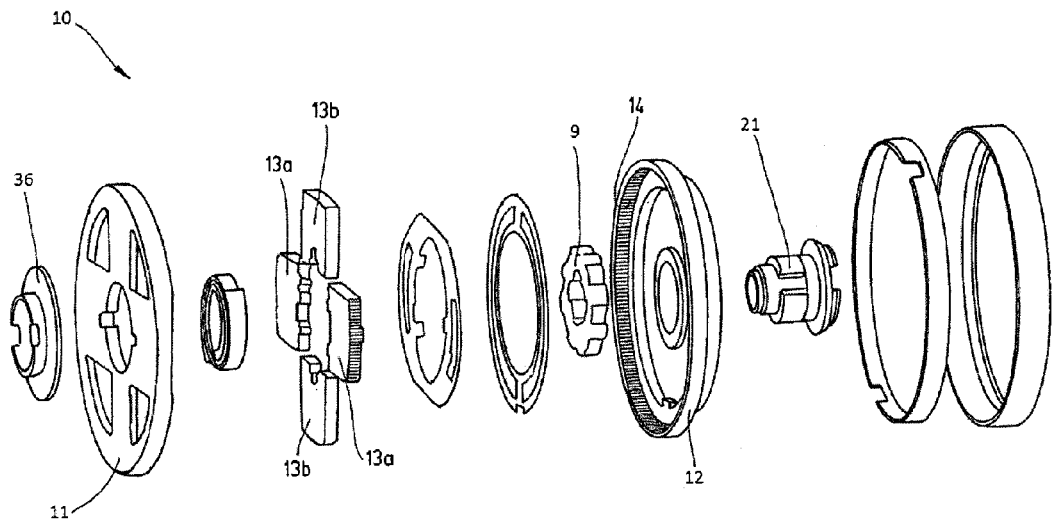
FIG. 8 shows an exploded illustration of an exemplary embodiment.
Figure 9:
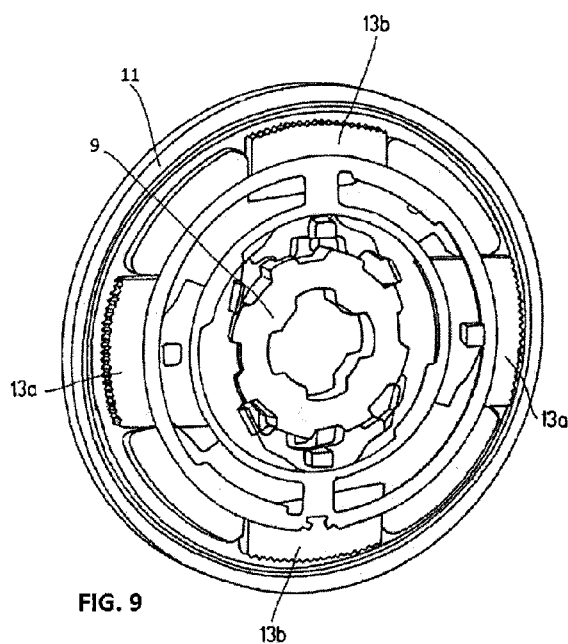
FIG. 9 shows a slightly perspective view of an exemplary embodiment without the second fitting part, in a use position.

According to a second basic type (as shown, for example, in FIGS. 8 and 9), the fitting 10 is configured as a detent fitting, in which the first fitting part 11 and the second fitting part 12 are lockable with respect to one another, as described, for example, in DE 10 2006 015 560 B3, the relevant disclosure of which is expressly incorporated herein. The second fitting part 12 has guide segments which, with straight guide surfaces, pairwise laterally in the radial direction guide one lock each. The locks 13a and 13b are provided at their radially outer end with a toothing which can engage with a toothed ring 14 of the first fitting part 11, which is configured as a hollow wheel. When the toothed ring 14 and the locks 13a and 13b cooperate, the fitting 10 is locked. The guide segments bear against the toothed ring 14 of the first fitting part 11 with one bent bearing surface each, the two fitting parts 11 and 12 thus bearing one another. An eccentric 9 which is arranged in the installation space which is defined between the fitting parts 11 and 12 is seated on the driver 21 in a rotationally secure manner or at least mechanically connected with it. A spring arrangement acts upon the eccentric 9 which influences on the radially movable locks 13a and 13b and acts upon them, so that they are pressed radially outward, in order to engage in the toothed ring 14. A control disc which preferably is seated on the eccentric 9 or on the driver 21 in a rotationally secure manner, cooperates with the locks 13a and 13b, in order to take the locks 13a and 13b back, i.e. to pull them radially inward from the toothed ring 14, thus unlocking the fitting 10 and the two fitting parts 11 and 12 being rotatable relative to one another, during a rotation (by few degrees) of the driver 21 and the eccentric 9 of the control disc which is driven by it. The inclination of the backrest 4 is thus adjustable for seating use between several positions of use.

Common to both basic types is that a quick fastener 50 is pushed over the shaft 7 from its outer end up to the fitting 10, preferably in the case of both fittings 10. The quick fastener 50, which builds a further component of the fitting system, is seated on the shaft 7 after its mounting in an axially non-displaceable manner. For this purpose, a plurality of (in the present case six) tongues 50b which are distributed in the circumferential direction, protrude radially inward (and axially in the direction which is faced away from the fitting 10) from the basic body 50a of the quick fastener 50, such basic body at least partly enclosing the shaft 7 in a ring-shaped manner. The tongues 50b of the quick fastener 50 which is composed, for example, of spring steel bear under bias against the shaft 7. Due to this frictional resistance, a displacement of the quick fastener 50 relative to the shaft 7 in the direction which is faced away from the fitting 10 is virtually impossible, i.e. in view of the forces acting during use and without tools, and, in the opposed direction (facing towards the fitting 10), in which the quick fastener 50 has been pushed on, it is considerably complicated and, due to its bearing against the fitting 10, impossible as well. Moreover, the tongues 50b and the splined shaft profile of the shaft 7 are form-fitting in the circumferential direction.

In order to also prevent a displacement of the shaft 7 relative to the fitting 10—and thus to the driver 21—, what is ensured by means of the quick fastener 50 bearing against the fitting in only one of two possible directions, the quick fastener 50 is connected, according to the invention, with the driver 21 or with its securing element 43, depending on which side of the fitting 10 faces towards the outer end of the shaft 7. The quick fastener 50 thus secures the cooperation of the shaft 7 and the driver 21 axially in both directions. For said connection, the quick fastener 50 has at least one, preferably a plurality of (in the present case six) fingers 50c which axially protrude from the basic body 50a, distributed in the circumferential direction, and which face towards the fitting 10. The fingers 50c preferably cooperate in a form-fitting manner with the driver 21 or with the securing element 43. They can be configured, for example, as hooks or the like, which engage behind the driver 21 or the securing element 43, for example engage in a continuous groove of the driver 21 with a lug 50d which faces radially inward. Between the fingers 50c, preferably in an alternating manner, further (in the present case six) axially protruding segments 50e are provided, which can facilitate positioning of the quick fastener 50 relative to the driver 21.

LIST OF REFERENCE NUMERALS 1 vehicle seat
3 seat part
4 backrest
5 handwheel
7 shaft
10 fitting
11 first fitting part
12 second fitting part
21 driver
43 securing element
50 quick fastener
50a basic body
50b tongue
50c finger
50d lug
50e segment
9 eccentric
13a, 13b locks
14 toothed ring
15 toothed wheel
17 toothed ring
24 eccentric

The invention claimed is:

1. A fitting system for a motor vehicle seat, comprising:
an axially extending shaft rotatable in the circumferential direction;
at least one fitting including a first fitting part and a second fitting part, wherein the first and second fitting parts are configured to be connected to a backrest and a seat part in such a manner that relative rotation of the first and second fitting parts will cause adjustment of inclination of the backrest;
a rotatably supported driver, wherein the driver drives or unlocks the fitting, wherein the shaft cooperates with the driver in the circumferential direction, wherein the shaft and the driver are rotationally secure or mechanically connected in order to rotate the driver;
a securing element that axially secures the driver and that is separate from the first and second fitting parts; and
at least one quick fastener seated on the shaft in an axially non-displaceable manner in order to secure the shaft and driver axially in at least one direction,
wherein the quick fastener includes a ring-shaped basic body that at least partially encloses the shaft,
wherein the quick fastener includes at least one finger which axially protrudes from the basic body and faces towards the fitting,
wherein the quick fastener is provided with tongues which protrude from the basic body radially inward, and which bear against the shaft under bias,
wherein the at least one finger is connected with and directly contacts the driver or the securing element,
wherein the at least one finger cooperates with and abuts the driver or the securing element in a form-fitting manner,
wherein the at least one finger axially fixes the shaft and the driver or the securing element relative to one another,
wherein the tongues prevent displacement of the quick fastener along the shaft in a first axial direction away from the fitting,
wherein the quick fastener bears against the fitting and exerts a force in a second axial direction that is opposite to the first axial direction, wherein the fitting prevents displacement of the quick fastener along the shaft in the second axial direction.

2. A fitting system according to claim 1, wherein the at least one finger is configured as at least one hook which engages behind the driver or the securing element.

3. A fitting system according to claim 1, wherein the at least one finger has a lug which faces radially inward.

4. A fitting system according to claim 1, wherein the at least one finger comprises a plurality of fingers, wherein the quick fastener is provided with segments between the fingers, such segments axially protruding from the basic body.

5. A fitting system according to claim 1, wherein the first and second fitting parts are in geared connection with one another by a toothed ring and a toothed wheel which meshes with it, which carry out a relative rolling movement due to a rotating eccentric which is driven by the driver, or wherein the first and second fitting parts can be locked with one another by radially displaceable locks which are guided by the one of the first and second fitting parts and upon which a spring-loaded, rotatably supported eccentric for cooperating with a toothed ring of the other fitting part can act, and which can be taken back by the rotation of the driver.

6. A motor vehicle seat having a fitting system according to claim 1.

7. A quick fastener for a fitting system for a motor vehicle seat that includes an axially extending shaft rotatable in the circumferential direction, at least one fitting including a first fitting part and a second fitting part, a rotatably supported driver that drives or unlocks the fitting, and a securing element that axially secures the driver and that is separate from the first and second fitting parts, the quick fastener comprising:
a ring-shaped basic body that is configured to at least partially enclose the shaft;
tongues which protrude from the basic body radially inward, and which are configured to bear against the shaft under bias; and
at least one finger which axially protrudes from the basic body and is configured to face toward the fitting,
wherein the at least one finger is configured to cooperate with and abut the driver or the securing element in a form-fitting manner,
wherein the at least one finger is configured to axially fix the shaft and the driver or securing element relative to one another,
wherein the quick fastener is configured to be seated on the shaft in an axially non-displaceable manner in order to secure the shaft and driver axially in at least one direction,
wherein the at least one finger is configured to be connected with and directly contact the driver or the securing element,
wherein the tongues prevent displacement of the quick fastener along the shaft in a first axial direction away from the fitting,
wherein the quick fastener bears against the fitting and exerts a force in a second axial direction that is opposite to the first axial direction, wherein the fitting prevents displacement of the quick fastener along the shaft in a second axial direction.

* * * * *